United States Patent
Messer

(10) Patent No.: US 12,179,321 B1
(45) Date of Patent: Dec. 31, 2024

(54) WHEEL WEIGHT REMOVAL DEVICE AND METHOD OF USE

(71) Applicant: The Reinalt-Thomas Corporation, Scottsdale, AZ (US)

(72) Inventor: Brandon Messer, Scottsdale, AZ (US)

(73) Assignee: The Reinalt-Thomas Corporation, Scottsdale, AZ (US)

( * ) Notice: Subject to any disclaimer, the term of this patent is extended or adjusted under 35 U.S.C. 154(b) by 0 days.

(21) Appl. No.: 18/504,877

(22) Filed: Nov. 8, 2023

(51) Int. Cl.
*B25B 27/00* (2006.01)
*B23D 51/10* (2006.01)
*B23D 57/00* (2006.01)
*B23D 61/00* (2006.01)

(52) U.S. Cl.
CPC .......... *B25B 27/0078* (2013.01); *B23D 51/10* (2013.01); *B23D 57/0076* (2013.01); *B23D 61/006* (2013.01)

(58) Field of Classification Search
CPC .................................................. B25B 27/0078
See application file for complete search history.

(56) References Cited

U.S. PATENT DOCUMENTS

| | | | | |
|---|---|---|---|---|
| 2,274,126 A * | 2/1942 | Carrigan | ............... | G01M 1/326 29/268 |
| 6,678,959 B1 * | 1/2004 | Phillip | ............... | B28D 1/06 451/356 |
| 7,661,195 B1 * | 2/2010 | Wood | ............... | B23D 61/12 30/392 |
| 9,044,844 B1 * | 6/2015 | Barnhart | ............. | B25B 27/0078 |
| 10,040,215 B2 * | 8/2018 | Rubens | ............... | B25F 5/02 |
| 2007/0209217 A1 * | 9/2007 | Ritter | ............... | B23D 49/11 30/392 |
| 2013/0239418 A1 * | 9/2013 | Kehoe | ............... | E04F 21/0084 30/277.4 |
| 2020/0238480 A1 * | 7/2020 | Wu | ............... | B25F 1/003 |

FOREIGN PATENT DOCUMENTS

EP 3871817 A1 * 9/2021 ........... A61B 17/142

* cited by examiner

*Primary Examiner* — Hwei-Siu C Payer
(74) *Attorney, Agent, or Firm* — Ballard Spahr LLP

(57) ABSTRACT

A tool attachment configured to remove a wheel weight from a vehicle wheel is disclosed. The tool attachment comprising a body. The body include an exterior surface, a first end, and a second end. A mounting surface is positioned on a first portion of the body proximate to the first end. The mounting surface is configured to abut a tool. An opening extends from the mounting surface to the exterior surface of the body. The opening is configured to receive a fastener to secure the body to the tool. A blade engage surface is positioned on a second portion of the body proximate to the second end. The blade engaging surface is configured to receive and secure a blade to the body. A tool including the tool attachment and a method of using the tool attachment are also disclosed.

20 Claims, 10 Drawing Sheets

WHEEL WEIGHT REMOVAL DEVICE AND METHOD OF USE

FIELD

This disclosure relates to a device and method for removing a wheel weight from a wheel, and in some exemplary aspects, to a device and method for removing wheel weights and wheel weight backing and adhesive from a barrel of a wheel of a vehicle.

BACKGROUND

Wheel weights are used to balance a wheel and tire assembly to prevent damage and wear on tires, bearings, shocks and other suspension components and improve ride quality which may result from out-of-balance tires. Over time, tires may need to be re-balanced or new tires replacing old tires may need to be balanced which requires used wheel weights to be removed and new wheel weights to be installed. To balance a wheel, used wheel weights are removed from the wheel, the tire is installed on the wheel, and the wheel and tire assembly are placed on the balancer. The assembly is then spun on the balancer to determine where the new wheel weights should be placed on the wheel so that the tire and wheel assembly are balanced. Generally, wheel weights have a double-sided tape backing that may be used to stick the weight to the inside of the wheel. To remove used wheel weights, technicians typically use flex blades to remove the wheel weight and scrape the backing and adhesive off the wheel. The flex blades often become dull and rapidly lose their effectiveness for removing the wheel weights, backing, and adhesive.

Further, current tools and methods of removing the wheel weight, backing and adhesive may be inefficient and ineffective, leaving residual backing and adhesive on the wheel. Residual backing and adhesive may prevent proper adhesion of a new wheel weight at these locations resulting in the wheel weight falling off. Wheel weights falling off after service may lead to returns for service and/or damage to the vehicle. Further, limitations of available wheel weight removal tools have led technicians to use other unsuitable tools and methods to remove wheel weights, backing and adhesive. For example, technicians have used flat head screw drivers, hammers and other tools not meant to remove wheel weights, backing, and/or adhesive leading to injuries to the technician and/or damage to the wheel.

Accordingly, a device which efficiently and easily removes a wheel weight, including the backing and adhesive, while reducing or eliminating damage to the wheel and risk of injury to the user is desirable.

SUMMARY

Described herein, in various aspects, is a tool attachment comprising a body extending along a first axis. The body comprises an exterior surface, a first end and a second end. A mounting surface is positioned on a first portion of the body proximate to the first end. The mounting surface is configured to abut a tool. An opening extends from the mounting surface to the exterior surface of the body. The opening is configured to receive a fastener to secure the body to the tool. A blade engaging surface is positioned on a second portion of the body proximate to the second end. The blade engaging surface is configured to receive and secure a blade to the body.

In one aspect, the opening comprises threads configured to mate with the fastener.

In one aspect, the second portion of the body comprising the blade engaging surface extends along a second axis angled with respect to the first axis. In a further aspect, the second axis is at a first angle from 0-90 degrees with respect to the first axis. In a further aspect, the first angle ranges from 30-60 degrees with respect to the first axis.

In one aspect, the second portion of the body comprising the blade engaging surface extends along the second axis at a second angle with respect to the first axis. In a further aspect, the second angle ranges from 0-90 degrees with respect to the first axis. In a further aspect, the second angle ranges from 30-60 degrees with respect to the first axis.

In one aspect, the tool is an oscillating power tool. In a further aspect, the tool is an orbital sander.

In one aspect, the blade engaging surface comprises at least one projection configured to insert into a corresponding recess on the blade.

In one aspect, the second portion of the body comprising the blade engaging surface is recessed in the body.

In one aspect, at least a section of the second portion of the body comprising the blade engaging surface adjacent the second end of the body tapers toward the exterior surface of the body.

In one aspect, the tool attachment further comprises a clamping member configured to connect to the second portion of the body comprising the blade engaging surface. The clamping member comprises an end configured to align with the second end of the body and a clamping surface proximate to the end. The clamping member is configured to clamp the blade to the blade engaging surface.

In a further aspect, the second portion of the body comprises at least one first hole and the clamping member comprises at least one second hole. Each first hole of the at least one first hole is configured to align with a corresponding second hole of the at least one second hole to receive a fastener to secure the clamping member to the second portion of the body.

In a further aspect, at least a portion of an exterior surface of the clamping member proximate the end of the clamping member tapers toward the clamping surface.

Described herein, in various aspects, is a tool comprising a structure configured to oscillate, rotate, or vibrate. The structure comprises a tool attachment receiving surface. A tool attachment connects to the structure. The tool attachment comprises a body extending along a first axis. The body comprises an exterior surface, a first end and a second end. A mounting surface is positioned on a first portion of the body proximate to the first end. The mounting surface abuts the tool attachment receiving surface. A blade engaging surface is positioned on a second portion of the body proximate to the second end. A blade is secured to the blade engaging surface.

In one aspect, the tool attachment receiving surface comprises a threaded opening. The tool attachment further comprises an opening extending from the mounting surface to the exterior surface of the body. A fastener is inserted through the opening of the tool attachment and is screwed into the threaded opening in the tool attachment receiving surface to secure the body to the structure.

In one aspect, the second portion of the body comprising the blade engaging surface extends along a second axis angled with respect to the first axis.

In a further aspect, the second axis is at a first angle from 0-90 degrees with respect to the first axis. In a further aspect, the first angle ranges from 30-60 degrees with respect to the first axis.

In one aspect, the second portion of the body comprising the blade engaging surface extends along the second axis at a second angle with respect to the first axis. In a further aspect, the second angle ranges from 0-90 degrees with respect to the first axis. In a further aspect, the second angle ranges from 30-60 degrees with respect to the first axis.

In one aspect, the blade engaging surface comprises at least one projection inserted into a corresponding recess on the blade.

In one aspect, the second portion of the body comprising the blade engaging surface is recessed in the body.

In one aspect, at least a section of the second portion of the body comprising the blade engaging surface adjacent the second end of the body tapers toward the exterior surface of the body.

In one aspect, the tool attachment further comprises a clamping member connected to the second portion of the body comprising the blade engaging surface. The clamping member comprises an end aligned with the second end of the body and a clamping surface proximate to the end to clamp the blade to the blade engaging surface.

In a further aspect, the second portion of the body comprises at least one first hole and the clamping member comprises at least one second hole. Each first hole of the at least one first hole aligns with a corresponding second hole of the at least one second hole and receives a fastener to secure the clamping member to the second portion of the body.

In a further aspect, at least a portion of an exterior surface of the clamping member proximate the end of the clamping member tapers toward the clamping surface.

Also described herein, in various aspects, is a method of using the tool described above. The method comprises positioning the blade of the tool between a backing of a wheel weight adhered to a surface of a wheel and the surface of the wheel. The method comprises triggering the tool to oscillate, rotate, or vibrate. The method comprises removing the backing of the wheel weight from the surface of the wheel with the blade.

DETAILED DESCRIPTION

Figure 1:
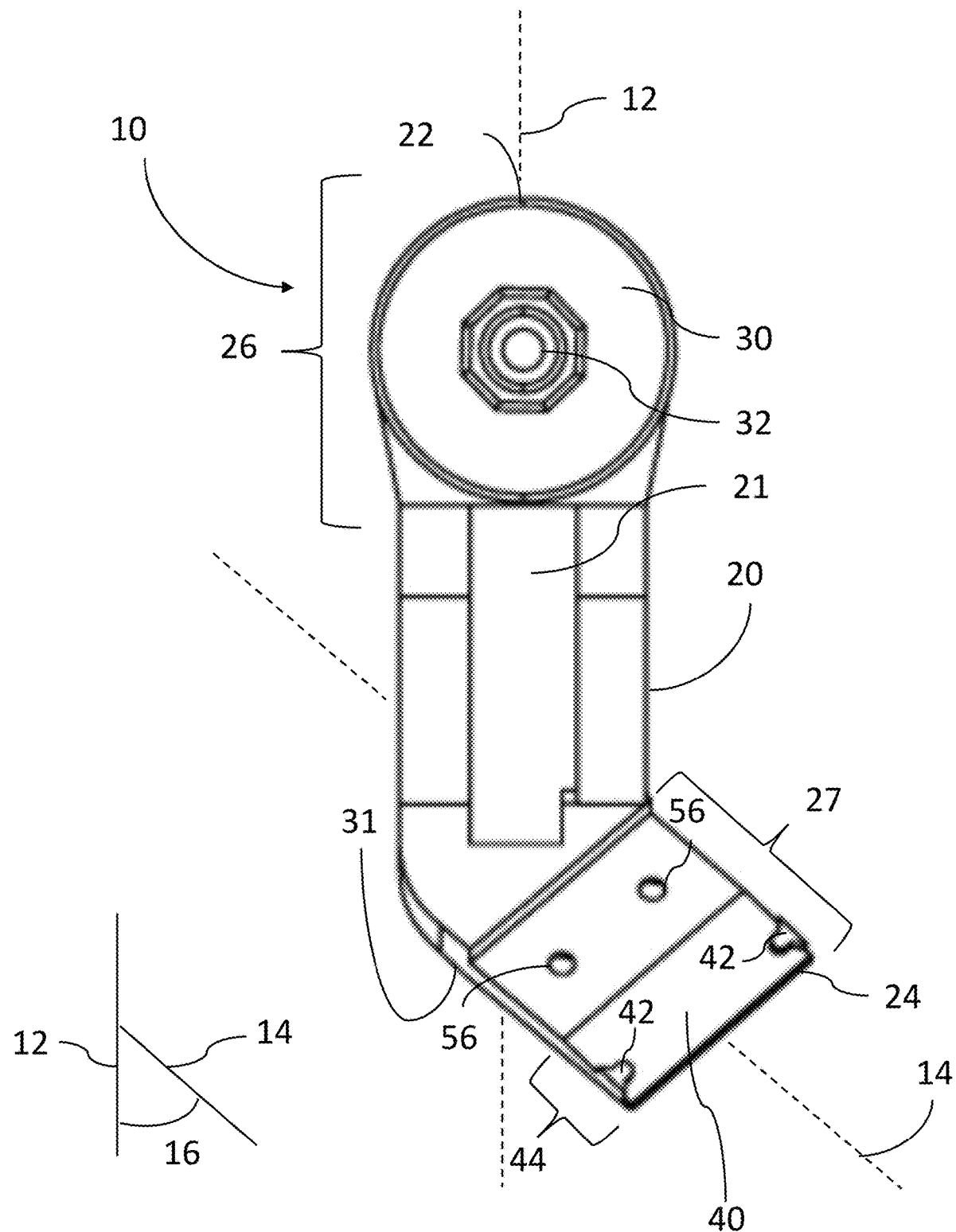
FIG. 1 is a front view of an example tool attachment as disclosed herein.

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout. It is to be understood that this invention is not limited to the particular methodology and protocols described, as such may vary. It is also to be understood that the terminology used herein is for the purpose of describing particular embodiments only, and is not intended to limit the scope of the present invention.

Many modifications and other embodiments of the invention set forth herein will come to mind to one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

As used herein the singular forms "a," "an," and "the" include plural referents unless the context clearly dictates otherwise. For example, unless the context dictates otherwise, use of the term "a surface" can represent disclosure of embodiments in which only a single surface is provided, as well as alternative embodiments in which a plurality of such surfaces are provided.

All technical and scientific terms used herein have the same meaning as commonly understood to one of ordinary skill in the art to which this invention belongs unless clearly indicated otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. Optionally, in some aspects, when values are approximated by use of the antecedent "about," it is contemplated that values within up to 15%, up to 10%, up to 5%, or up to 1% (above or below) of the particularly stated value can be included within the scope of those aspects. Similarly, in some optional aspects, when values are approximated by use of the terms "approximately," "substantially," or "generally," it is contemplated that values within up to 15%, up to 10%, up to 5%, or up to 1% (above or below) of the particular value can be included within the scope of those aspects. When used with respect to an identified property or circumstance, "substantially" or "generally" can refer to a degree of deviation that is sufficiently small so as to not measurably detract from the identified property or circumstance, and the exact degree of deviation allowable may in some cases depend on the specific context.

As used herein, the terms "optional" or "optionally" mean that the subsequently described event or circumstance may or may not occur, and that the description includes instances where said event or circumstance occurs and instances where it does not.

The word "or" as used herein means any one member of a particular list and, except where the context indicates otherwise, in alternative aspects, can also include any combination of members of that list.

The following description supplies specific details in order to provide a thorough understanding. Nevertheless, the skilled artisan would understand that the apparatus and associated methods of using the apparatus can be implemented and used without employing these specific details. Indeed, the apparatus and associated methods can be placed into practice by modifying the illustrated apparatus and associated methods and can be used in conjunction with any other apparatus and techniques conventionally used in the industry.

Figure 2:
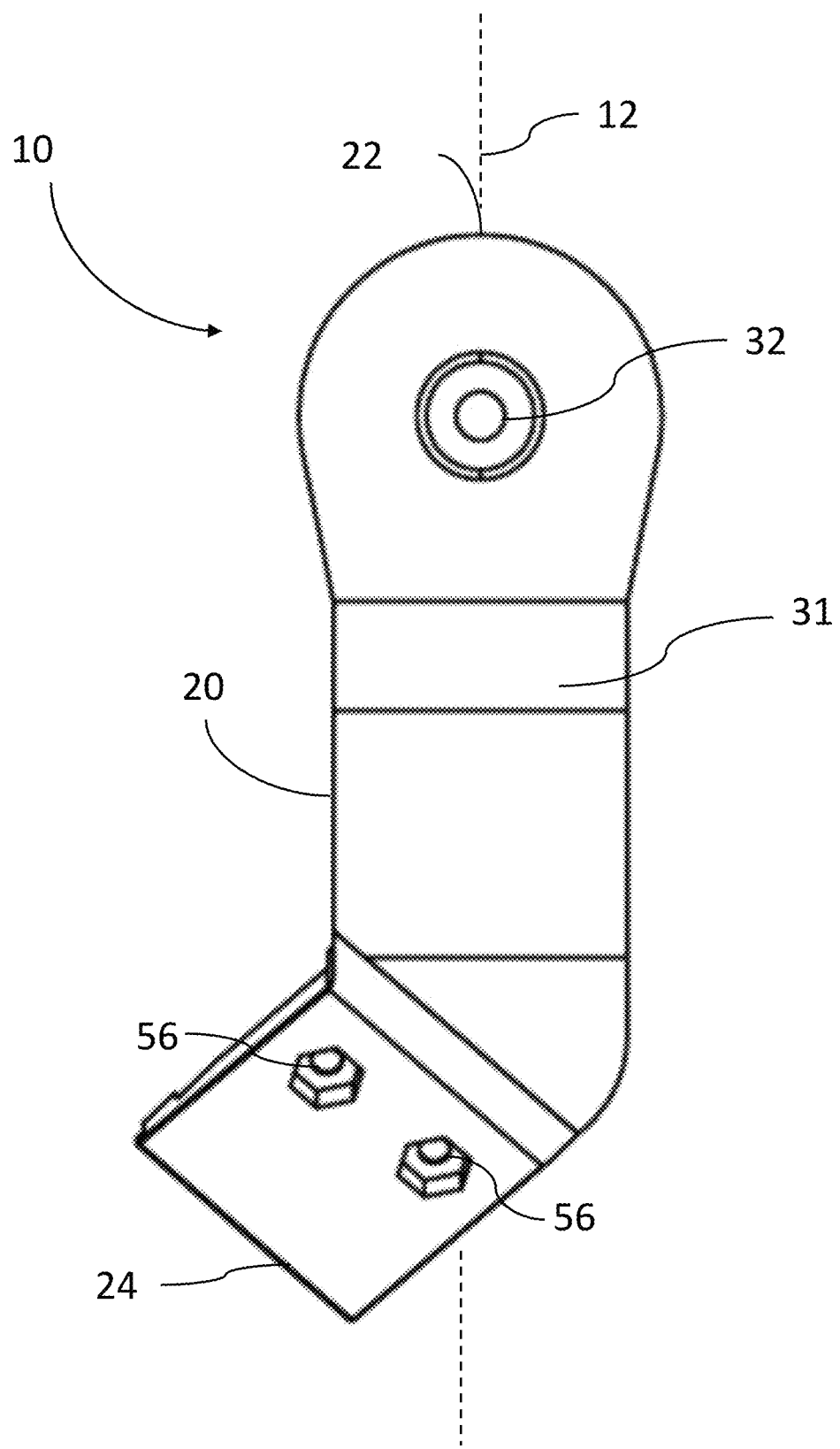
FIG. 2 is a back view of the tool attachment of FIG. 1.
Figure 3:
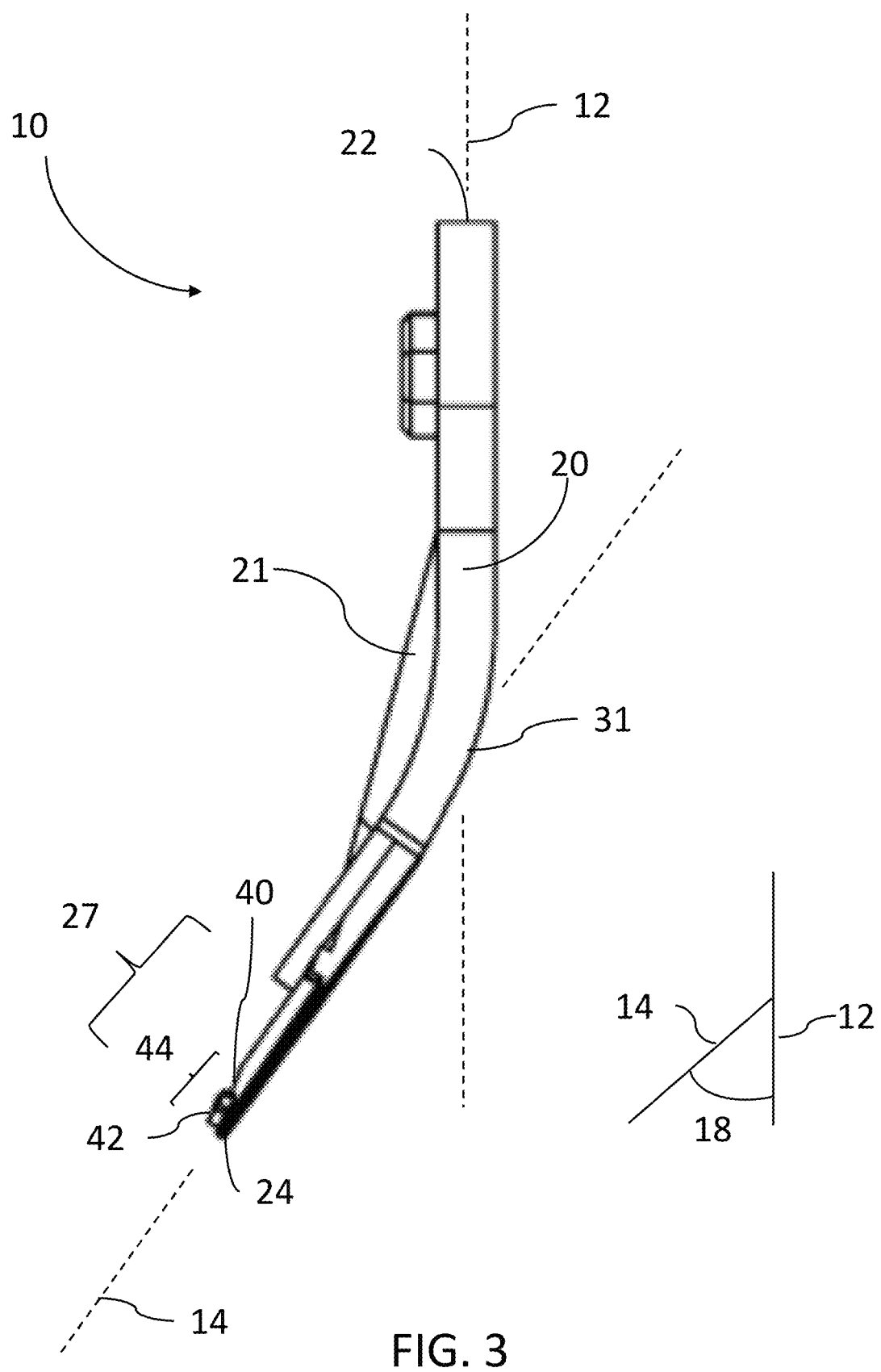
FIG. 3 is a side view of the tool attachment of FIG. 1.

Disclosed herein, and with reference to FIGS. 1-3, is a tool attachment 10 that may be configured remove a wheel weight, including the backing and adhesive, from a vehicle wheel. The tool attachment 10 comprises a body 20 extending along a first axis 12. The body 20 comprises an exterior surface (shown in FIGS. 2 and 3), a first end 22 and a second end 24. The body 20 may comprise a support structure 21 configured to brace the body 20. A mounting surface 30 is positioned on a first portion 26 of the body 20 proximate to the first end 22. The mounting surface 30 is configured to abut a tool. Optionally, the tool is an oscillating tool, for example, an orbital sander. An opening 32 extends from the mounting surface 30 to the exterior surface 31 of the body 20. The opening 32 is configured to receive a fastener (not shown) to secure the body 20 to the tool. Optionally, the opening 32 may include threads configured to mate with threads of the fastener to secure the body 20 to the tool.

Figure 7:
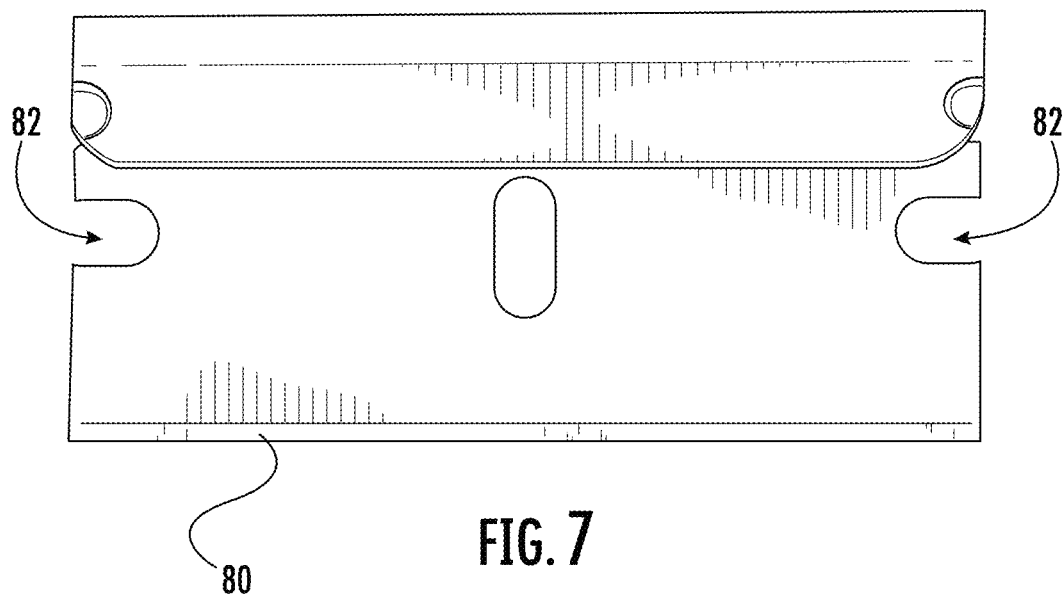
FIG. 7 is a top view of an example blade.

As shown in FIGS. 1 and 3, a blade engaging surface 40 is positioned on a second portion 27 of the body 20 proximate to the second end 24. As shown in FIGS. 1 and 3, the second portion 27 of the body 20 comprising the blade engaging surface 40 may be recessed in the body 20. The blade engaging surface 40 is configured to receive and secure a blade 80 (shown in FIG. 7) to the body 20 with the blade 80 extending beyond the second end 24 of the body 20. The blade 80 is configured to remove the wheel weight, backing, and adhesive from the wheel. Optionally, the blade 80 may be a safety blade that will not scratch or chip the finish of a wheel. As shown in FIGS. 1 and 7, the blade engaging surface 40 may comprise at least one projection 42 configured to insert into a corresponding recess 82 on the blade 80 to position and secure the blade 80 on the blade engaging surface 40. Optionally, at least a section 44 of the second portion 27 of the body 20 comprising the blade engaging surface 40 adjacent the second end 24 of the body 20 may taper towards the exterior surface 31 of the body 20 to angle the blade 80 towards the exterior surface 31 and to more efficiently remove the wheel weight, backing, and adhesive by positioning the blade 80 at an angle with respect to the wheel surface.

As shown in FIG. 1, the second portion 27 of the body 20 comprising the blade engaging surface 40 may extend along a second axis 14 that is transverse to the first axis 12. The second axis 14 may extend at a first angle 16. Optionally, the second axis 14 is at a first angle 16 from 0-90 degrees with respect to the first axis 12. Optionally, the second axis 14 is at a first angle 16 from 30-60 degrees with respect to the first axis 12. Optionally, the first angle 16 is 45 degrees with respect to the first axis 12. As shown in FIG. 3, the second portion 27 of the body 20 comprising the blade engaging surface 40 may extend along the second axis 14 at a second angle 18. Optionally, the second angle 18 may range from 0-90 degrees with respect to the first axis 12. Optionally, the second angle 18 may range from 30-60 degrees with respect to the first axis 12. Optionally, the second angle 18 is 45 degrees with respect to the first axis 12. The length and angle of the second portion 27 of the body 20 may allow a user to apply a force to the tool attachment 10 and maintain maximum pressure upon the wheel surface to cleanly remove the wheel weight, backing and adhesive while preventing the wheel or other components, for example the axle pad of the wheel, from limiting or obstructing movement of the tool and/or tool attachment 10.

Figure 4:
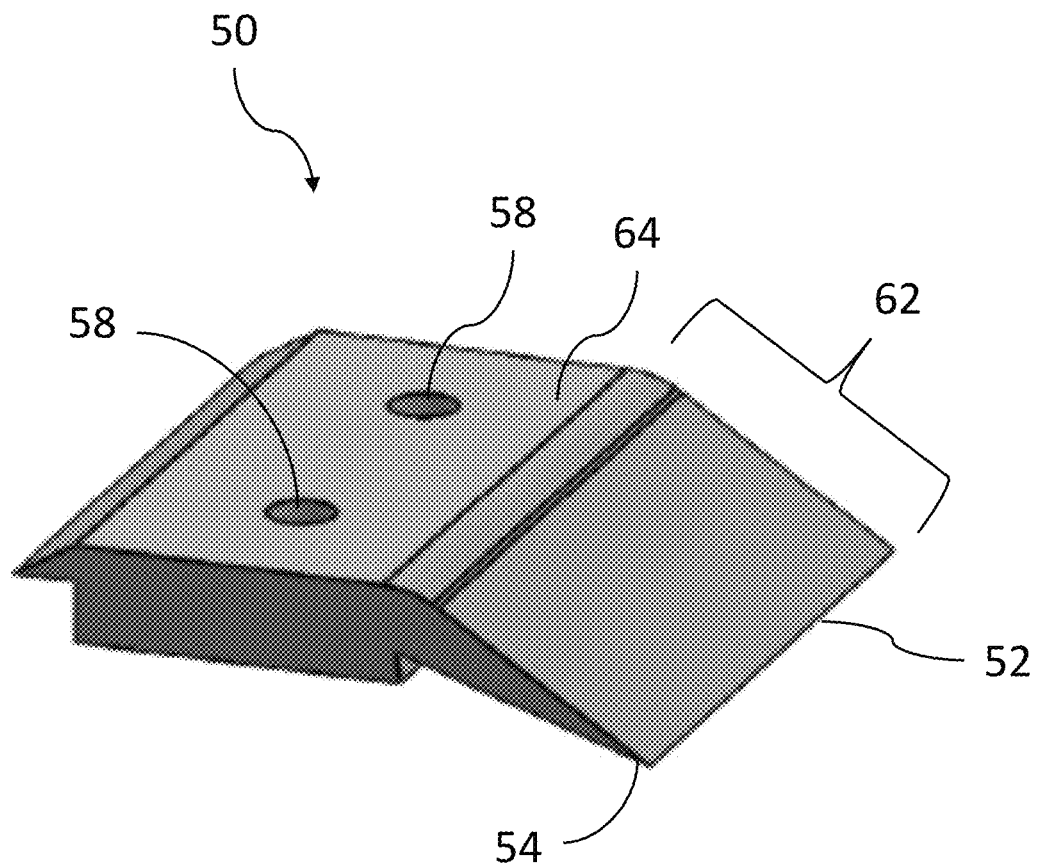
FIG. 4 is a perspective view of an example clamping member.
Figure 5:
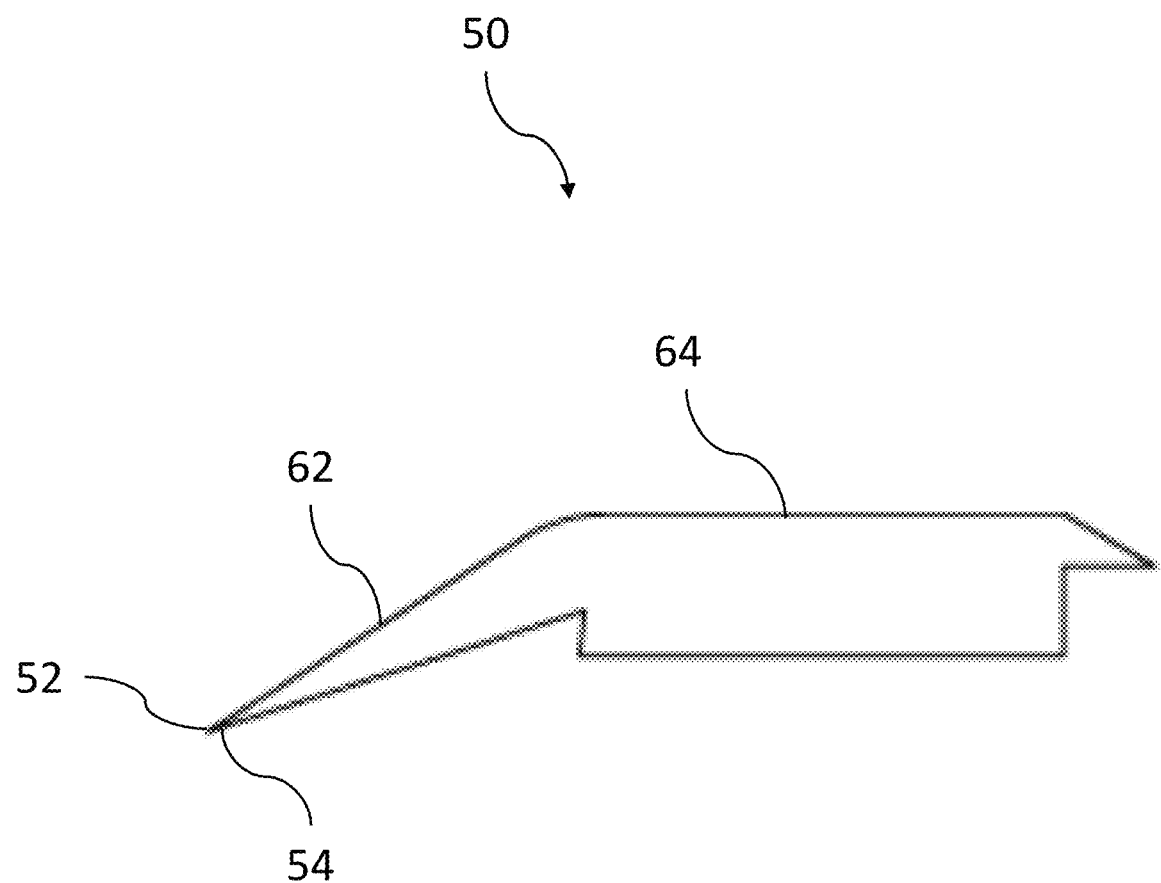
FIG. 5 is a side view of the clamping member of FIG. 4.
Figure 6:
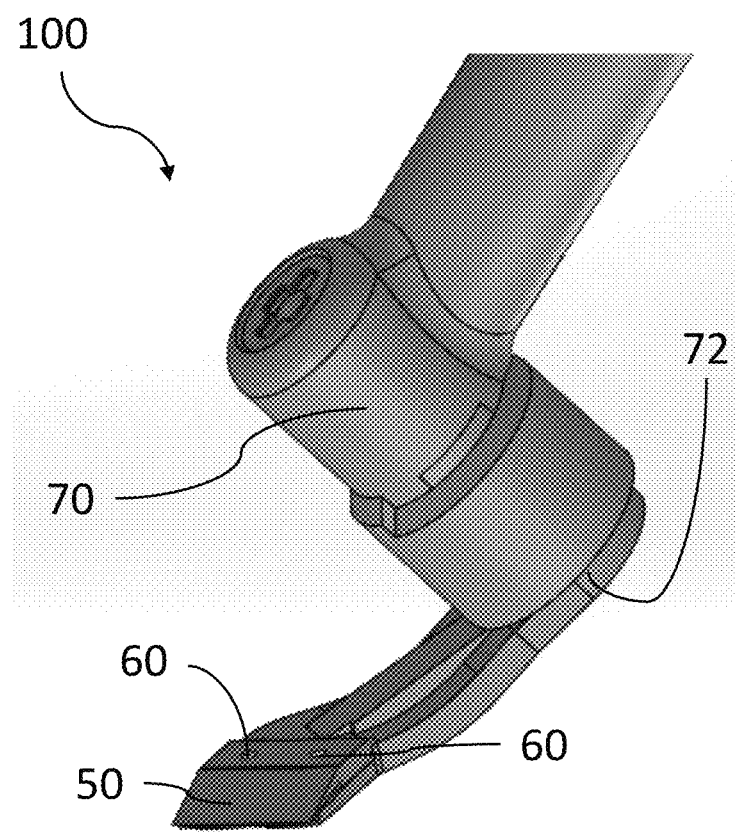
FIG. 6 is a perspective view of an example tool as disclosed herein.

As shown in FIGS. 4 and 5, the tool attachment 10 may further comprise a clamping member 50 configured to connect to the second portion 27 of the body 20 comprising the blade engaging surface 40. The clamping member 50 may comprise an end 52 configured to align with the second end 24 of the body 20 and a clamping surface 54 proximate to the end 24. The clamping member 50 may be configured to clamp the blade 80 to the blade engaging surface 40. At least a portion 62 of an exterior surface 64 of the clamping member 50 proximate the end 52 of the clamping member 50 may taper towards the clamping surface 54. As shown in FIGS. 2, 3, and 4, the second portion 27 of the body 20 may comprise at least one first hole 56. The clamping member 50 may comprise at least one second hole 58. Each first hole 56 of the at least one first hole is configured to align with a corresponding second hole 58 of the at least one second hole to receive a fastener 60 (shown in FIG. 6) to secure the clamping member 50 to the second portion 27 of the body 20. The clamping member 50 may be loosened or removed from the second portion 27 of the body 20 to allow a used, dull, or damaged blade 80 to be replaced by another blade.

Figure 8:
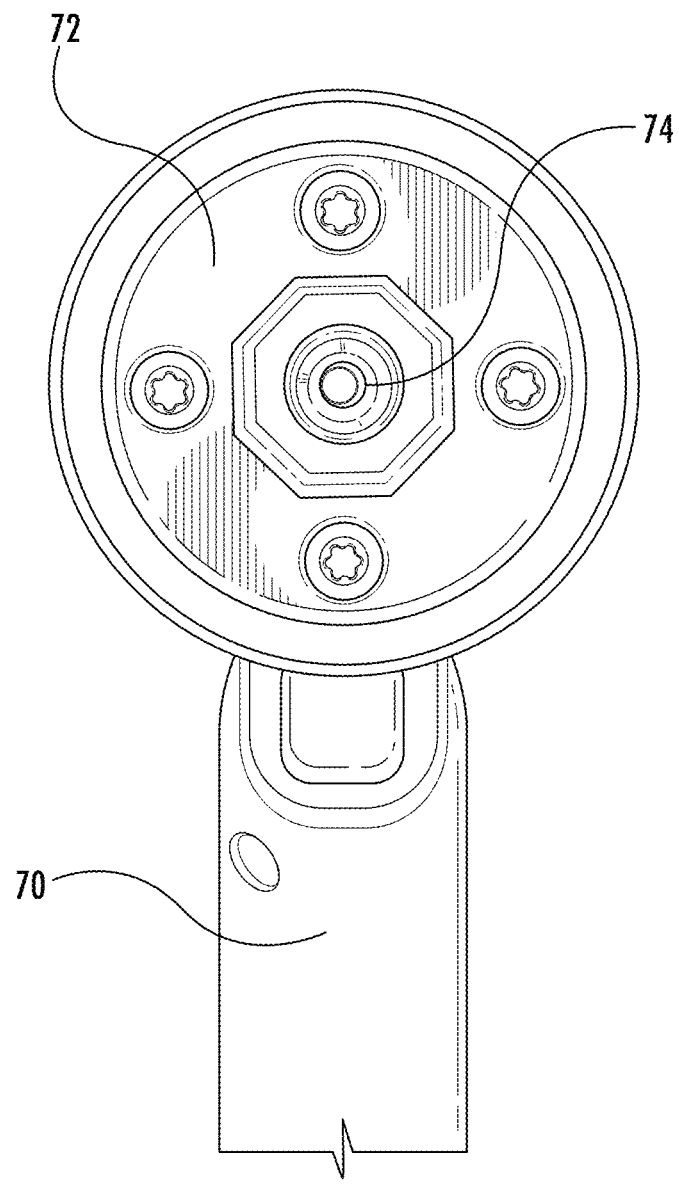
FIG. 8 is a bottom view of an example structure.
Figure 9:
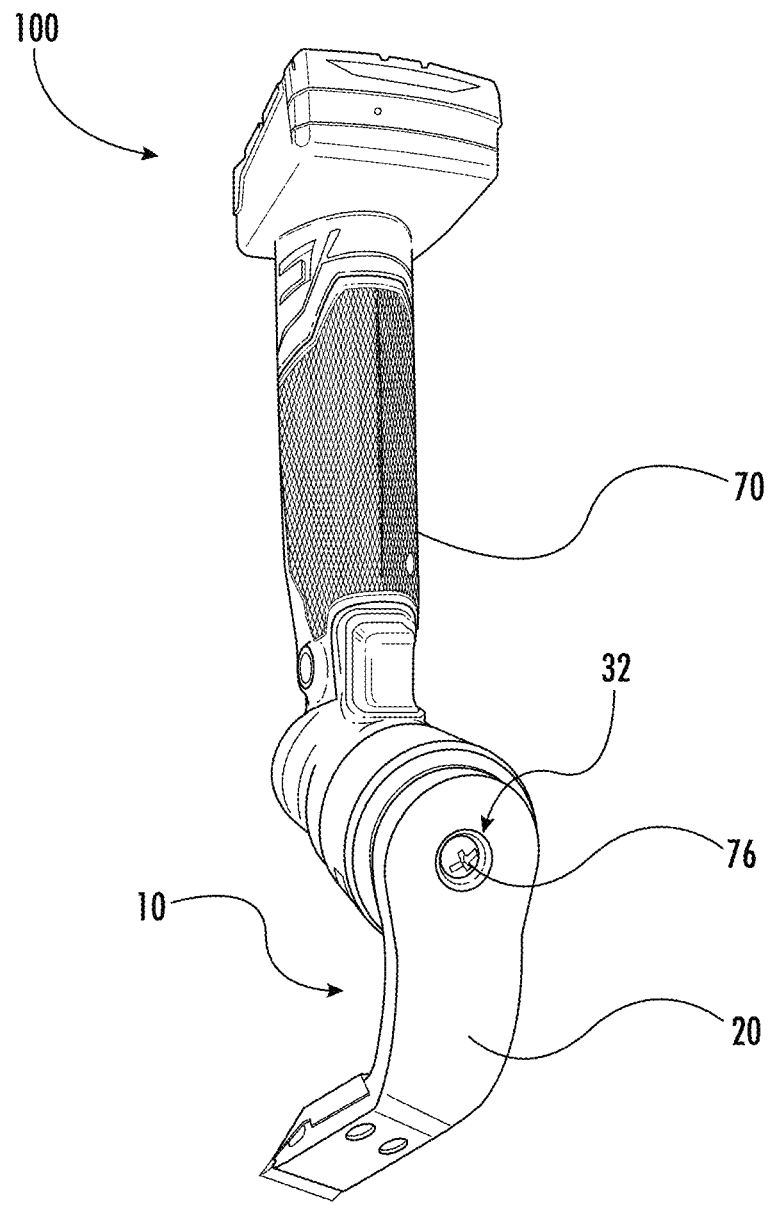
FIG. 9 is a bottom view of an example tool.
Figure 10:
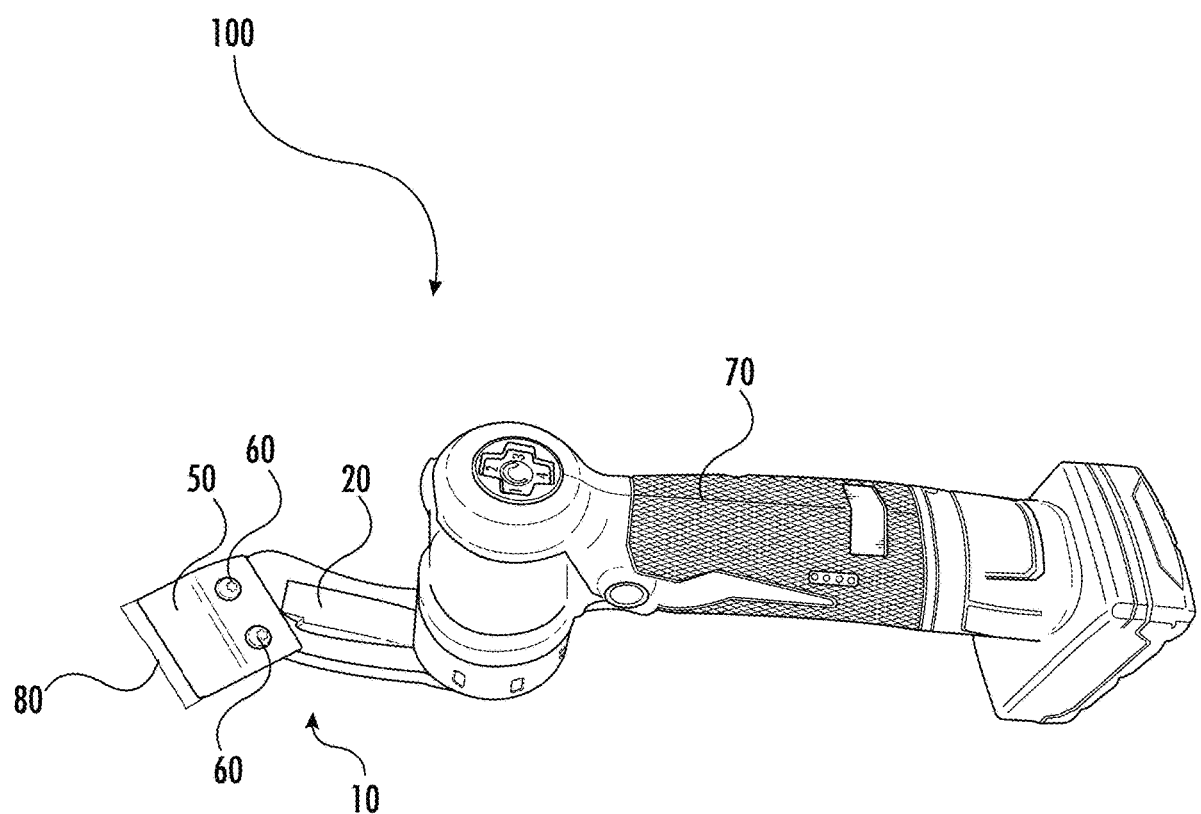
FIG. 10 is a perspective view of an example tool and blade.

Described herein, in various aspects, is a tool 100 comprising a structure 70 configured to oscillate, rotate, and/or vibrate. The structure 70 may be a battery powered tool. Optionally, the structure 70 may be an orbital sander. Optionally, the structure 70 may be a housing motor of an orbital sander. The structure 70 may comprise a motor configured to oscillate, rotate, and or vibrate at least a component of the structure 70. The motor may be battery powered. As shown in FIG. 8, the structure 70 comprises a tool attachment receiving surface 72. The motor may oscillate, rotate, and or vibrate the tool attachment receiving surface 72. Optionally, the tool attachment receiving surface 72 may be a bottom surface of an orbital sander. A tool attachment 10 connects or couples to the structure 70 with the mounting surface 30 (shown in FIG. 1) of the tool attachment 10 abutting the tool attachment receiving surface 72. The tool attachment receiving surface 72 may comprise a threaded opening 74 configured to mate with threads of a fastener 76 extending through the opening 32 in the body 20 of the tool attachment 10 to secure the tool attachment 10 to the structure 70 (as shown in FIG. 9). As shown in FIG. 10, a blade 80 may be secured to the tool attachment 10. The structure 70 is configured to oscillate, rotate, and/or vibrate the tool attachment 10 and blade 80 coupled or connected to the structure 70. A user may position the tool 100 at a desired angle and location, trigger the structure 70 to oscillate, rotate and/or vibrate the tool attachment 10 and blade 80, and provide a small amount of force to the tool 100 to remove the wheel weight, backing, and/or adhesive from the wheel.

Described herein, in various aspects, is a method of using the tool described above. The method comprises positioning the blade of the tool between a backing of a wheel weight adhered to a surface of a wheel and the surface of the wheel. The method comprises triggering the tool to oscillate, rotate, and/or vibrate thereby oscillating, rotating, and/or vibrating the tool attachment and blade. The method comprises removing the wheel weight, backing, and/or adhesive from the surface of the wheel with the blade.

It is expected that the tool attachment and tool according to the disclosure can efficiently and easily remove a wheel weight, including the backing and adhesive, while reducing or eliminating damage to the wheel and risk of injury to the user.

Although the foregoing invention has been described in some detail by way of illustration and example for purposes of clarity of understanding, certain changes and modifications may be practiced within the scope of the appended claims.

What is claimed is:

1. A tool attachment comprising:
a body extending along a first axis, the body comprising an exterior surface, a first end and a second end;
a mounting surface positioned on a first portion of the body proximate to the first end, the mounting surface configured to abut a tool;
an opening extending from the mounting surface to the exterior surface of the body, the opening configured to receive a fastener to secure the body to the tool; and
a blade engaging surface positioned on a second portion of the body proximate to the second end, the blade engaging surface configured to receive and secure a blade to the body, wherein
the blade engaging surface comprises at least one projection configured to insert into a corresponding recess on the blade.

2. The tool attachment according to claim 1, wherein the opening comprises threads configured to mate with the fastener.

3. The tool attachment according to claim 1, wherein the second portion of the body comprising the blade engaging surface extends along a second axis, the second axis extending at a first angle with respect to the first axis.

4. The tool attachment according to claim 3, wherein the second axis extends at a second angle with respect to the first axis.

5. The tool attachment according to claim 1, wherein the tool is an oscillating power tool.

6. The tool attachment according to claim 1, wherein the second portion of the body comprising the blade engaging surface is recessed in the body.

7. The tool attachment according to claim 1, wherein at least a section of the second portion of the body comprising the blade engaging surface adjacent the second end of the body tapers toward the exterior surface of the body.

8. The tool attachment according to claim 1 further comprising a clamping member configured to connect to the second portion of the body comprising the blade engaging surface, the clamping member comprising an end configured to align with the second end of the body and a clamping surface proximate to the end and configured to clamp the blade to the blade engaging surface.

9. The tool attachment according to claim 8, wherein at least a portion of an exterior surface of the clamping member proximate the end of the clamping member tapers toward the clamping surface.

10. A tool comprising:
a structure configured to oscillate, rotate, or vibrate, the structure comprising a tool attachment receiving surface;
a tool attachment connected to the structure, the tool attachment comprising:
a body extending along a first axis, the body comprising an exterior surface, a first end and a second end,
a mounting surface positioned on a first portion of the body proximate to the first end, the mounting surface abutting the tool attachment receiving surface, and
a blade engaging surface positioned on a second portion of the body proximate to the second end; and
a blade secured to the blade engaging surface, wherein the blade engaging surface comprises at least one projection configured to insert into a corresponding recess on the blade.

11. The tool according to claim 10, wherein the tool attachment receiving surface comprises a threaded opening, the tool attachment further comprises an opening extending from the mounting surface to the exterior surface of the body, and a fastener is inserted through the opening of the tool attachment and is screwed into the threaded opening in the tool attachment receiving surface to secure the body to the structure.

12. The tool according to claim 10, wherein the second portion of the body comprising the blade engaging surface extends along a second axis, the second axis extending at a first angle with respect to the first axis.

13. The tool according to claim 12, wherein the second axis extends at a second angle with respect to the first axis.

14. The tool according to claim 10, wherein the second portion of the body comprising the blade engaging surface is recessed in the body.

15. The tool according to claim 10, wherein at least a section of the second portion of the body comprising the blade engaging surface adjacent the second end of the body tapers toward the exterior surface of the body.

16. The tool according to claim 10, wherein the tool attachment further comprises a clamping member connected to the second portion of the body comprising the blade engaging surface, the clamping member comprising an end aligned with the second end of the body and a clamping surface proximate to the end to clamp the blade to the blade engaging surface.

17. The tool according to claim 16, wherein at least a portion of an exterior surface of the clamping member proximate the end of the clamping member tapers toward the clamping surface.

18. A method of using the tool according to claim 10, the method comprising:
positioning the blade of the tool between a backing of a wheel weight adhered to a surface of a wheel and the surface of the wheel;
triggering the tool to oscillate, rotate, or vibrate; and
removing the backing of the wheel weight from the surface of the wheel with the blade.

19. A tool attachment comprising:
a body extending along a first axis, the body comprising an exterior surface, a first end and a second end;
a mounting surface positioned on a first portion of the body proximate to the first end, the mounting surface configured to abut a tool;
an opening extending from the mounting surface to the exterior surface of the body, the opening configured to receive a fastener to secure the body to the tool;
a blade engaging surface positioned on a second portion of the body proximate to the second end, the blade engaging surface configured to receive and secure a blade to the body; and
a clamping member configured to connect to the second portion of the body comprising the blade engaging surface, the clamping member comprising an end configured to align with the second end of the body and a clamping surface proximate to the end and configured to clamp the blade to the blade engaging surface.

20. A tool comprising:
a structure configured to oscillate, rotate, or vibrate, the structure comprising a tool attachment receiving surface;
a tool attachment connected to the structure, the tool attachment comprising:
 a body extending along a first axis, the body comprising an exterior surface, a first end and a second end,
 a mounting surface positioned on a first portion of the body proximate to the first end, the mounting surface abutting the tool attachment receiving surface,
 a blade engaging surface positioned on a second portion of the body proximate to the second end, and
 a clamping member connected to the second portion of the body comprising the blade engaging surface; and
a blade secured to the blade engaging surface, wherein
the clamping member comprises an end aligned with the second end of the body and a clamping surface proximate to the end to clamp the blade to the blade engaging surface.

* * * * *